(12) United States Patent
Lee

(10) Patent No.: US 8,233,717 B2
(45) Date of Patent: Jul. 31, 2012

(54) SYSTEM AND METHOD FOR EXTRACTING FEATURE DATA OF DYNAMIC OBJECTS

(75) Inventor: Cheng-Hsien Lee, Taipei Hsien (TW)

(73) Assignees: Hon Hai Industry Co., Ltd., Tu-Cheng, New Taipei (TW); Massachusetts Institute of Technology, Cambridge (*) Notice: Subject to any disclaimer, the term of this patent is extended or adjusted under 35 U.S.C. 154(b) by 396 days.

(21) Appl. No.: 12/650,430

(22) Filed: Dec. 30, 2009

(65) Prior Publication Data

US 2011/0158539 A1 Jun. 30, 2011

(51) Int. Cl.
*G06K 9/00* (2006.01)
*G06K 9/40* (2006.01)
(52) U.S. Cl. ........................ 382/195; 382/128
(58) Field of Classification Search .......... 382/195, 382/118, 165, 203, 285; 340/5.53, 5.83; 348/94
See application file for complete search history.

(56) References Cited

U.S. PATENT DOCUMENTS

| 7,054,850 B2* | 5/2006 | Matsugu | 706/48 |
| 7,711,157 B2* | 5/2010 | Duong et al. | 382/118 |
| 8,055,685 B2* | 11/2011 | Timmons | 707/803 |
| 2002/0038294 A1* | 3/2002 | Matsugu | 706/20 |
| 2011/0176710 A1* | 7/2011 | Mattiuzzi et al. | 382/128 |

* cited by examiner

*Primary Examiner* — Vikkram Bali
*Assistant Examiner* — Nancy Bitar
(74) *Attorney, Agent, or Firm* — Altis Law Group, Inc.

(57) ABSTRACT

A system and method for extracting feature data of dynamic objects selects sequential N frames of a video file up front, where N is a positive integer, and divides each of the N frames into N*N squares. The system and method further selects any n frames from the N frames, selects any n rows and n columns of the n frames to obtain n*n*n squares, where n is a positive integer. The system and method further extracts feature data from the video file by computing averages and differences for pixel values of the n*n*n squares.

20 Claims, 4 Drawing Sheets

SYSTEM AND METHOD FOR EXTRACTING FEATURE DATA OF DYNAMIC OBJECTS

BACKGROUND

1. Technical Field

Embodiments of the present disclosure generally relate to systems and methods for processing data, and more particularly to a system and a method for extracting feature data of dynamic objects.

2. Description of Related Art

Feature data extraction is very important for object detection. With good feature data extraction method, objects can be easily and accurately detected by small sets of information. For example, Gabor filter can be used for detection of edge of objects in figure, hence, it can be used to distinguish different objects in figure. However, most feature data extraction methods are static-information-based. That is, these methods only use static spatial information for feature data extraction. For dynamic objects, like flames, since they are time-varying, they cannot be easily detected by feature data extracted from static spatial information.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
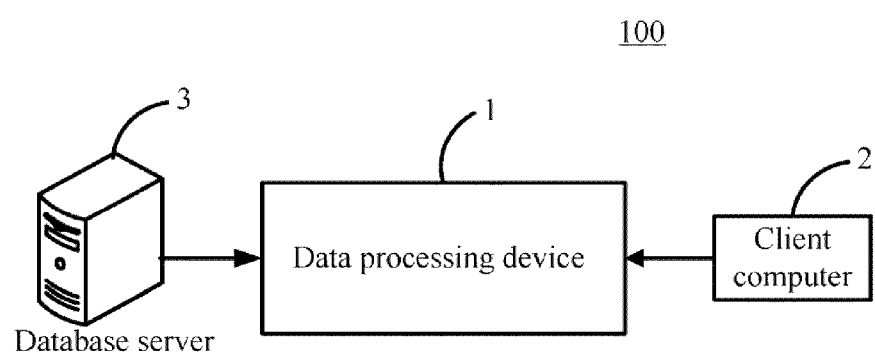
FIG. 1 is a block diagram of one embodiment of a system for extracting feature data of dynamic objects.

FIG. 1 is a block diagram of one embodiment of a system 100 for extracting feature data of dynamic objects. In one embodiment, the system 100 includes a data processing device 1, a client computer 2, and a database server 3. The data processing device 1 connects to the client computer 2 and the database server 3 electronically. The data processing device 1 includes a plurality of function modules (see below descriptions) operable to extract feature data of a dynamic object. The client computer 2 provides a user interface for implementing the operation of extracting feature data of the dynamic objects. The database server 3 is a data source that stores given data. In the present embodiment, the given data may be video files of the dynamic objects. The dynamic objects may be flames, for example.

Figure 2:
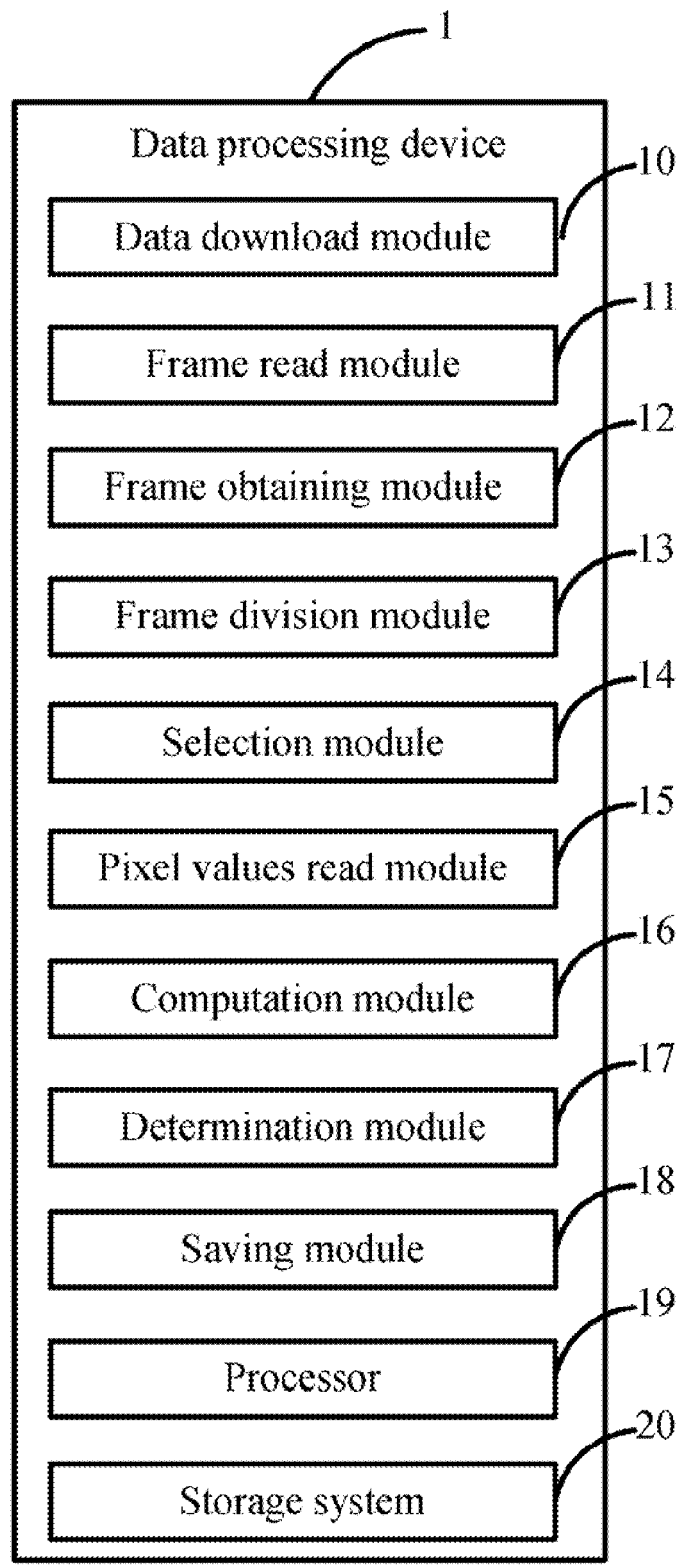
FIG. 2 is a block diagram illustrating one embodiment of function modules of a data processing device in FIG. 1.

FIG. 2 is a block diagram illustrating one embodiment of function modules of the data processing device 1 in FIG. 1. In one embodiment, the function modules of the data processing device 1 may include a data download module 10, a frame read module 11, a frame obtaining module 12, a frame division module 13, a selecting module 14, a pixel values read module 15, a computation module 16, a determination module 17, and a saving module 18.

In one embodiment, at least one processor 19 of the data processing device 1 executes one or more computerized codes of the function modules 10-18. The one or more computerized codes of the functional modules 10-18 may be stored in a storage system 20 of the data processing device 1.

The data download module 10 is operable to download a video file of the dynamic objects from the database server 3. In one embodiment, the dynamic objects may be flames.

The frame read module 11 is operable to read each frame of the video file. It may be understood that, a frame is a single picture on a roll of the video file.

The frame obtaining module 12 is operable to obtain sequential N frames of the video file, where N is a positive integer. In one embodiment, N may be 4.

Figure 3:
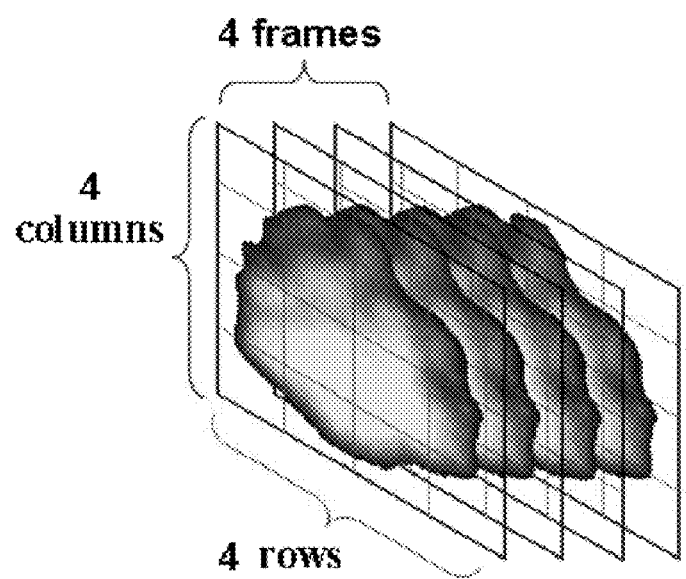
FIG. 3 shows an example of a division of frames in the video file of flames.

The frame division module 13 is operable to divide each of the N frames into N*N squares. It may be understood that, "*" is a multiplication sign. FIG. 3 shows an example of a division of 4 frames of the video file of flames.

The selecting module 14 is operable to select any n frames from the N frames randomly, and select any n rows and n columns of the n frames randomly to obtain n*n*n squares, where n is a positive integer. In one embodiment, n may be 2, for example.

The pixel values read module 15 is operable to read pixel values of the n*n*n squares.

The computation module 16 is operable to compute averages and differences for the pixel values of the n*n*n squares using predetermined formulas. If n is two, one example of the formulas is illustrated as follows:

$$\text{First set} = \begin{cases} (A+B+C+D+X+Y+Z+W)/8 \\ (A-B+C-D+X-Y+Z-W)/8 \\ (A+B-C-D+X+Y-Z-W)/8 \\ (A-B-C+D+X-Y-Z+W)/8 \end{cases}$$

$$\text{Second set} = \begin{cases} (A+B+C+D-X-Y-Z-W)/8 \\ (A-B+C-D-X+Y-Z+W)/8 \\ (A+B-C-D-X-Y+Z+W)/8 \\ (A-B-C+D-X+Y+Z-W)/8 \end{cases}$$

Where, A, B, C, D, X, Y, Z, and W are pixel values of eight squares. It may be understood that, the averages and differences for the pixel values of the n*n*n squares are feature data extracted from the video file.

The determination module 17 is operable to determine if all combinations of any n rows and n columns of the n frames have been selected, if all combinations of any n frames from the N frames have been selected, and if all frames of the video file have been selected, so as to implement the above modules 12-16 repeatedly to extract more feature data from the video file.

The saving module 18 is operable to save all the feature data into the database server 3.

Figure 4:
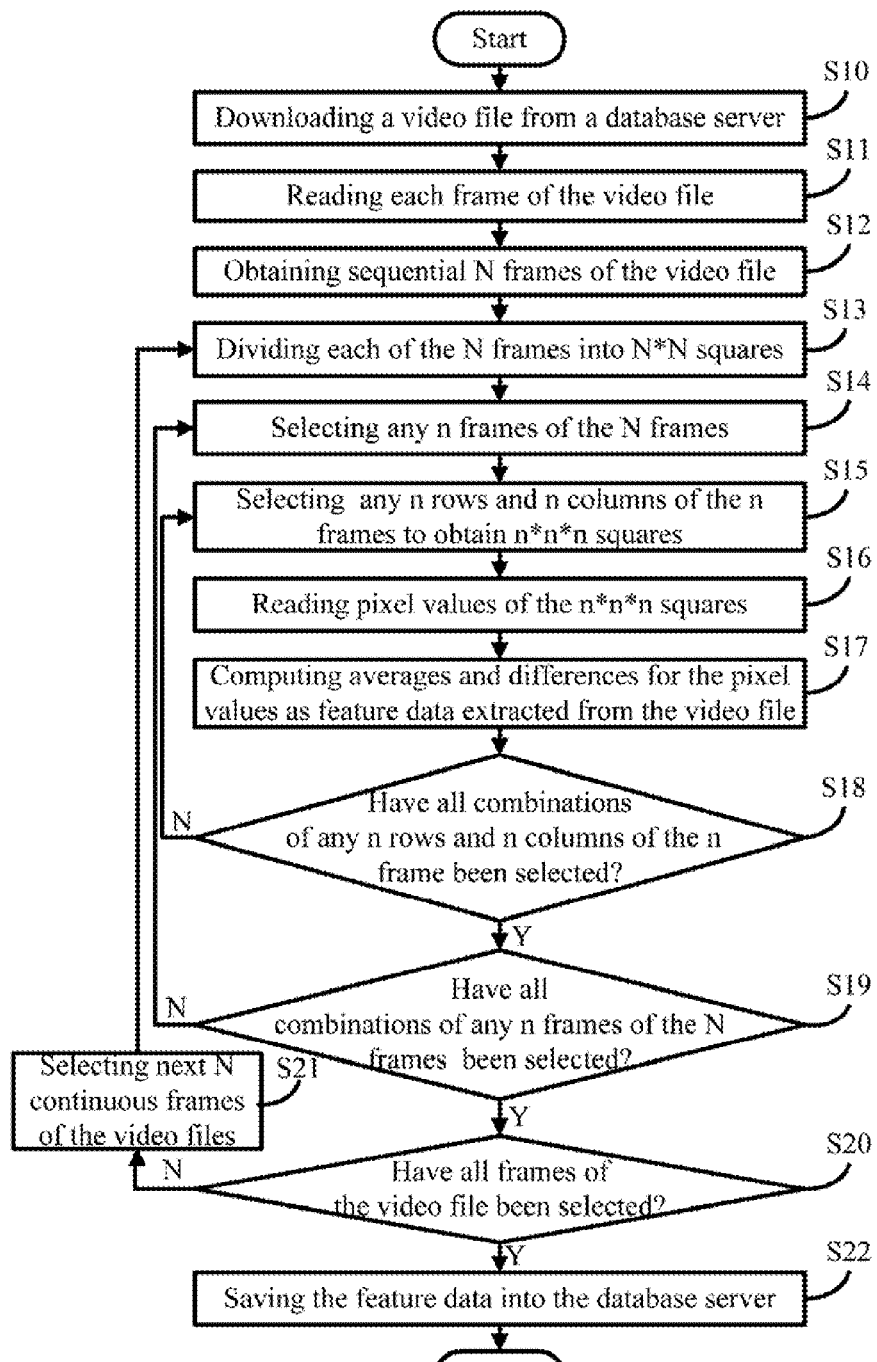
FIG. 4 is a flowchart of one embodiment of a method for extracting feature data of dynamic objects.

FIG. 4 is a flowchart of one embodiment of a method for extracting feature data of dynamic objects. Depending on the embodiment, additional blocks in the flow of FIG. 4 may be added, others removed, and the ordering of the blocks may be changed.

In block S10, the data download module 10 downloads a video file of the dynamic objects from the database server 3. In one embodiment, the dynamic objects may be flames, for example.

In block S11, the frame read module 11 reads each frame, namely each single picture on a roll of the video file.

In block S12, the frame obtaining module 12 obtains sequential N frames of the video file, where N is a positive integer. In one embodiment, N may be 4.

In block S13, the frame division module 13 divides each of the N frames into N*N squares, where "*" is a multiplication sign, such as illustrated in FIG. 3.

In block S14, the selecting module 14 selects any n frames from the N frames randomly.

In block S15, the selecting module 14 selects any n rows and n columns of the n frames randomly to obtain n*n*n squares, where n is a positive integer. In one embodiment, n may be 2, for example.

In block S16, the pixel values read module 15 reads pixel values of the n*n*n squares.

In block S17, the computation module 16 computes averages and differences for the pixel values of the n*n*n squares using predetermined formulas. If n is two, one example of the formulas is illustrated as follows:

$$\text{First set} = \begin{cases} (A+B+C+D+X+Y+Z+W)/8 \\ (A-B+C-D+X-Y+Z-W)/8 \\ (A+B-C-D+X+Y-Z-W)/8 \\ (A-B-C+D+X-Y-Z+W)/8 \end{cases}$$

$$\text{Second set} = \begin{cases} (A+B+C+D-X-Y-Z-W)/8 \\ (A-B+C-D-X+Y-Z+W)/8 \\ (A+B-C-D-X-Y+Z+W)/8 \\ (A-B-C+D-X+Y+Z-W)/8 \end{cases}$$

Where, A, B, C, D, X, Y, Z, and W are pixel values of eight squares. It may be understood that, the averages and differences for the pixel values of the n*n*n squares are feature data extracted from the video file.

In block S18, the determination module 17 determines if all combinations of any n rows and n columns of the n frames have been selected. If any one combination of n rows and n columns of the n frames has not been selected, block S15 is repeated. If all combinations of any n rows and n columns of the n frames have been selected, block S19 is implemented.

In block S19, the determination module 17 determines if all combinations of any n frames from the N frames have been selected. If any one combination of n frames from the N frames has not been selected, block S14 is repeated. If all combinations of any n frames from the N frames have been selected, block S20 is implemented.

In block S20, the determination module 17 determines if all frames of the video file have been selected. If any one of the frames of the video file has not been selected, block S21 is implemented for the frame obtaining module 12 obtaining next sequential N frames of the video files. After block S21, block S13 is repeated. If all frames of the video file have been selected, block S22 is implemented.

In block S22, the saving module 18 saves all the feature data into the database server 3.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for extracting feature data of dynamic objects, being performed by execution of computer readable program code by at least one processor of at least one computer system, the method comprising:
   (a) reading each frame of a video file;
   (b) selecting sequential N frames of the video file, wherein N is a positive integer;
   (c) dividing each of the N frames into N*N squares;
   (d) selecting any n frames from the N frames, wherein n is a positive integer;
   (e) selecting any n rows and n columns of the n frames to obtain n*n*n squares;
   (f) reading pixel values of the n*n*n squares; and
   (g) computing averages and differences for the pixel values of the n*n*n squares using predetermined formulas, wherein the averages and differences are feature data extracted from the video file.

2. The method as described in claim 1, wherein the dynamic objects are flames.

3. The method as described in claim 1, further comprising: repeating blocks from (e) to (g) upon condition that any one combination of n rows and n columns of the n frames has not been selected.

4. The method as described in claim 3, further comprising: repeating blocks from (d) to (g) upon condition that any one combination of n frames from the N frames has not been selected.

5. The method as described in claim 4, further comprising: selecting next sequential N frames of the video files upon condition that any one of the frames of the video file has not been selected; and
   repeating blocks from (c) to (g).

6. The method as described in claim 4, further comprising: downloading the video file of the dynamic objects from a data source; and
   saving the feature data.

7. The method as described in claim 4, wherein N is 4 and n is 2.

8. A non-transitory computer readable storage medium having stored thereon instructions that, when executed by a processor, cause the processor to perform a method for extracting feature data of dynamic objects, wherein the method comprises: (a) reading each frame of a video file; (b) selecting sequential N frames of the video file, wherein N is a positive integer; (c) dividing each of the N frames into N*N squares; (d) selecting any n frames from the N frames, wherein n is a positive integer; (e) selecting any n rows and n columns of the n frames to obtain n*n*n squares; (f) reading pixel values of the n*n*n squares; and (g) computing averages and differences for the pixel values of the n*n*n squares using predetermined formulas, wherein the averages and differences are feature data extracted from the video file.

9. The storage medium as described in claim 8, wherein the dynamic objects are flames.

10. The storage medium as described in claim 8, wherein the method further comprises:
    repeating blocks from (e) to (g) upon the condition that any one combination of n rows and n columns of the n frames has not been selected.

11. The storage medium as described in claim 10, wherein the method further comprises:

repeating blocks from (d) to (g) upon condition that any one combination of n frames from the N frames has not been selected.

12. The storage medium as described in claim 11, wherein the method further comprises:

selecting next sequential N frames of the video files upon condition that any one of the frames of the video file has not been selected; and repeating blocks from (c) to (g).

13. The storage medium as described in claim 8, further comprising:

downloading the video file of the dynamic objects from a data source; and saving the feature data.

14. The storage medium as described in claim 8, wherein N is 4 and n is 2.

15. A system for extracting feature data of dynamic objects, comprising:

a frame read module operable to read each frame of a video file;

a frame obtaining module operable to obtain sequential N frames of the video file, wherein N is a positive integer;

a frame division module operable to divide each of the N frames into N*N squares;

a selecting module operable to select any n frames from the N frames randomly, and select any n rows and n columns of the n frames randomly to obtain n*n*n squares, where n is a positive integer;

a pixel values read module operable to read pixel values of the n*n*n squares;

a computation module operable to compute averages and differences for the pixel values of the n*n*n squares using predetermined formulas, wherein the averages and differences are feature data extracted from the video file; and a processor that executes the data download module, the frame read module, the frame obtaining module, the frame division module, the selecting module, the pixel values read module, the computation module, and the saving module.

16. The system as described in claim 15, wherein the dynamic objects are flames.

17. The system as described in claim 15, further comprising:

a data download module operable to download the video file of the dynamic objects from a database server.

18. The system as described in claim 15, further comprising:

a determination module operable to determine if all combinations of any n rows and n columns of the n frames have been selected, if all combinations of any n frames from the N frames have been selected, and if all frames of the video file have been selected.

19. The system as described in claim 15, further comprising:

a saving module operable to save the feature data into the database server.

20. The system as described in claim 15, wherein N is 4 and n is 2.

* * * * *